United States Patent [19]

Nozaki

[11] Patent Number: 5,756,877

[45] Date of Patent: May 26, 1998

[54] SYSTEM FOR INSPECTING VEHICULAR SHOCK ABSORBER

[75] Inventor: Hiromichi Nozaki, Yokohama, Japan

[73] Assignees: Nissan Motor Co., Ltd., Kanagawa; Nissan Altia Co., Ltd., Tokyo, both of Japan

[21] Appl. No.: 716,707

[22] Filed: Sep. 10, 1996

[30] Foreign Application Priority Data

Nov. 30, 1995 [JP] Japan .................... 7-312644

[51] Int. Cl.⁶ ...................... G01M 17/04; G01M 19/00
[52] U.S. Cl. ............................. 73/11.09; 73/11.08
[58] Field of Search .................... 73/11.04, 11.07, 73/11.08, 11.09

[56] References Cited

U.S. PATENT DOCUMENTS

| | | | |
|---|---|---|---|
| 4,002,051 | 1/1977 | Hilbrands | 73/11.08 |
| 4,103,532 | 8/1978 | Buzzi | 73/11.06 |
| 4,376,387 | 3/1983 | Stevens et al. | 73/11.07 |
| 5,056,024 | 10/1991 | Stuyts | 73/11.08 |
| 5,125,681 | 6/1992 | Brackette, Jr. | 73/658 |

*Primary Examiner*—George M. Dombroske
*Assistant Examiner*—Max H. Noori
*Attorney, Agent, or Firm*—Lowe, Price, LeBlanc & Becker

[57] ABSTRACT

The invention inspects a shock absorber installed in a vehicle between a vehicle body and a road wheel by manually moving the vehicle body in a generally vertical direction of the vehicle until the vehicle body initiates vibration in the vertical direction, detecting vertical displacement of the vehicle body, detecting load imposed on road surface by the road wheel, giving, as a damping force, the load detected at moment when the detected displacement is zero, and calculating a first derivative, with respect to time, of the detected displacement at the moment to give the result as a piston speed of the shock absorber at the moment. The damping force against the piston speed is compared with a predetermined damping force against the piston speed to evaluate whether the shock absorber has been deteriorated or not.

16 Claims, 9 Drawing Sheets

$$K = \frac{b}{a} \ [kg/mm]$$

SYSTEM FOR INSPECTING VEHICULAR SHOCK ABSORBER

BACKGROUND OF THE INVENTION

1. Field of the Invention

The present invention relates to a system for and a method of inspecting a shock absorber installed in a vehicle between a vehicle body thereof and road wheels.

2. Description of the Prior Art

Shock absorbers installed in automobiles need regular inspection because accumulation of travel distance and aging cause a drop in damping force exhibited by the shock absorbers. Various inspection systems have been proposed and known according to which shock absorbers are inspected as they are installed in an automotive vehicle. Among them, it is known to use a displacement measuring unit of the ultrasonic type in measuring vertical displacement of a portion on a vehicle body adjacent a shock absorber between the vehicle body and a road wheel. Result of this measurement is fed to a controller for comparison with reference data stored therein. The comparison result is displayed on a screen. Inspection using this known system is initiated by manually moving the vehicle body to cause the vehicle body to vibrate in its vertical direction. That portion of the measured data which have been obtained after the vehicle body begins to vibrate, without any manual assistance, is compared with the stored reference data which have been collected after measurement conducted with respect to a vehicle body installed with new shock absorbers. Based on the comparison result displayed on a screen, one can evaluate whether the shock absorber is in good order or not. This known system poses a problem that damping force of the shock absorbers cannot be directly measured. Thus, even if damping force characteristic data of a new shock absorber is available, the measured data by this known system cannot be compared with the damping force characteristic data, making it impossible to correctly recognize how much the shock absorber has degraded.

Another known inspection system proposes the use of a hydraulic machine to vibrate a road wheel connected to a shock absorber and the use of a load sensor to measure load imposed on a road surface by the road wheel. According to this known system, based on the sensor output, one can evaluate whether the shock absober is in good order or not. The use of such bulky hydraulic machine causes a cost push-up. Another problem is that the sensor output which shows variation of load imposed on the road surface by the road wheel cannot be compared with the before-mentioned damping force characteristic data and thus one cannot recognize how much the shock absorber has degraded.

An object of the present invention is to provide a system for and a method of inspecting a shock absorber installed in a vehicle whereby a care taker can evaluate state of the shock absorber in terms of how much its damping characteristic has deviated from its original or designed damping force characteristic data.

SUMMARY OF THE INVENTION

According to one aspect of the present invention, there is provided a system for inspecting a shock absorber installed in a vehicle between a body of the vehicle and a road wheel thereof, the system comprising:

means for detecting displacement of the vehicle body and generating a displacement signal indicative of the detected displacement;

means for detecting load imposed on road surface by the road wheel and generating a load signal indicative of the detected load;

controller means coupled with said displacement measuring means and said load signal detecting means, said controller means being operative to set as a damping force the load signal upon said displacement signal being zero, said controller means being operative to calculate a first derivative, with respect to time, of the displacement signal to give the result as a piston speed of the shock absorber.

According to another aspect of the present invention, there is provided a method of inspecting a shock absorber installed in a vehicle between a body of the vehicle and a road wheel thereof, the method comprising the steps of:

manually moving the vehicle body in a generally vertical direction of the vehicle until the vehicle body initiates vibration in the vertical direction;

detecting a displacement of the vehicle body in the vertical direction relative to the road wheel;

detecting load imposed on road surface by the road wheel;

giving, as a damping force, the load detected at moment when the detected displacement is zero;

calculating a first derivative, with respect to time, of the detected displacement at the moment to give the result as a piston speed of the shock absorber at the moment;

comparing the damping force against the piston speed with a predetermined damping force against the piston speed;

passing the test if, at the piston speed, the damping force falls in a predetermined window around the predetermined damping force;

failing the test if, at the piston speed, the damping force fall outside of the predetermined window.

DETAILED DESCRIPTION OF THE INVENTION

Figure 1:
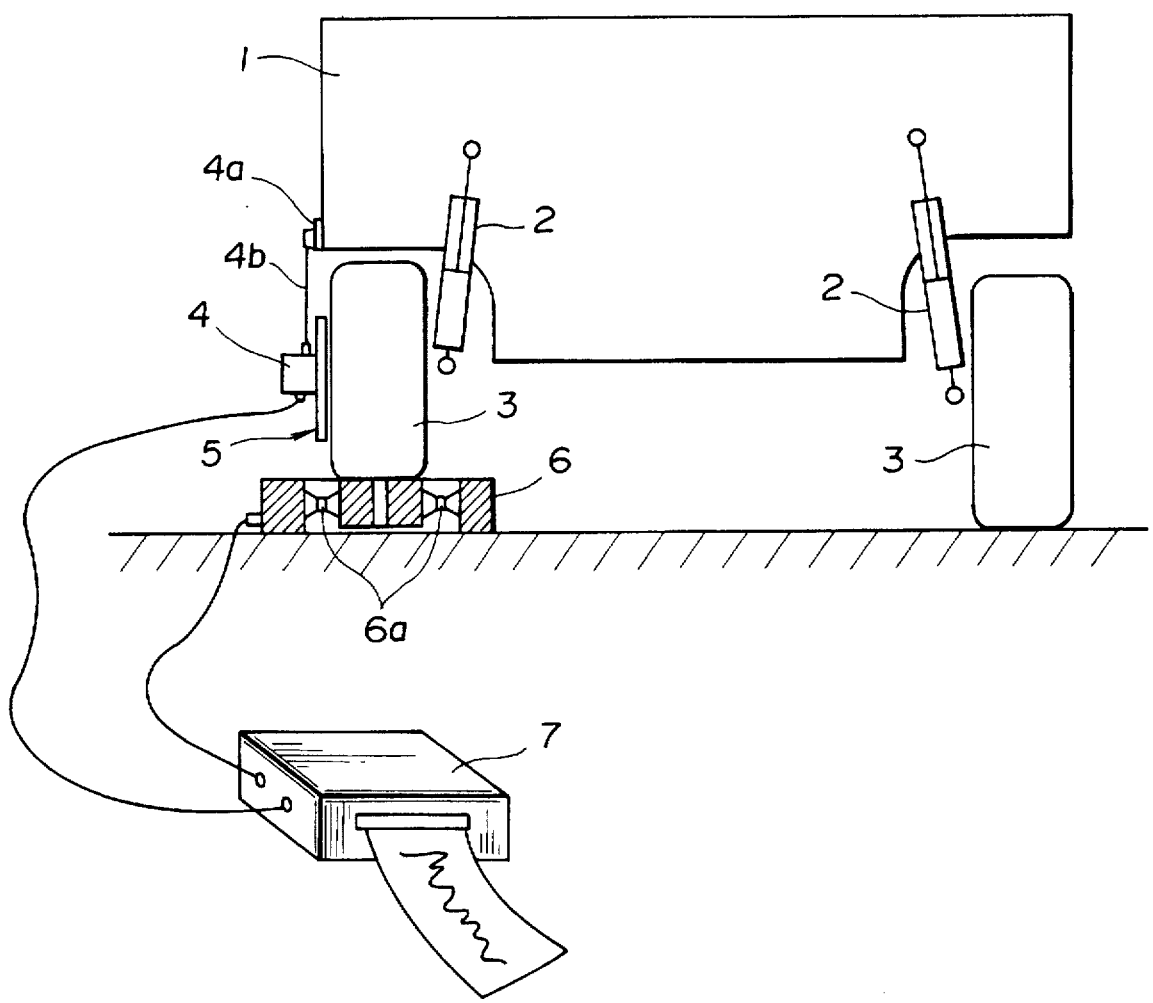
FIG. 1 is a block diagram of the configuration of a vehicular shock absorber inspecting system according to the present invention.
Figure 7:
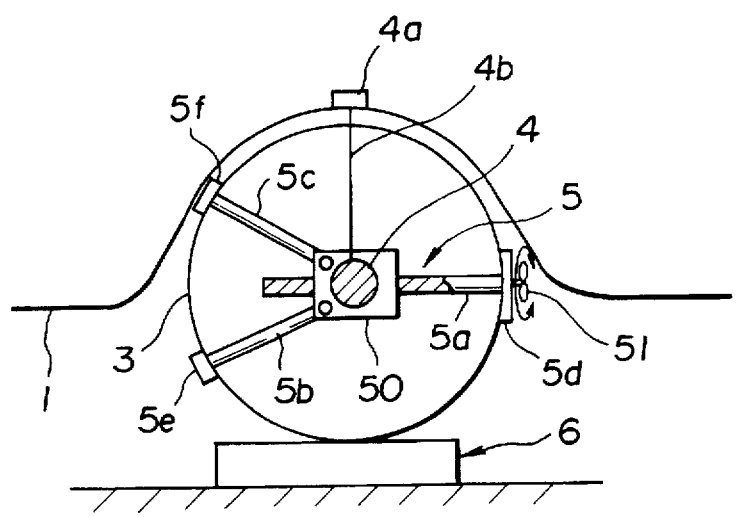
FIG. 7 is a diagram of the configuration of an apparatus for securely attaching a displacement sensor of the wire type to a road wheel.

Referring to FIGS. 1 and 7, reference numeral 1 designates a vehicle body of an automotive vehicle having a plurality of road wheels 3 and a plurality of shock absorbers 2 for the road wheels, respectively. Each of the shock absorbers 2 is installed in the vehicle between the vehicle body 1 and the associated road wheel 3, in a known manner. Between the vehicle body 1 and each of the road wheels 3 is a coil spring, not shown, in a known manner to cooperate with the associated shock absorber 2 to prevent or at least reduce transmission of shocks imparted to the road wheel 3 from road surface.

FIG. 1 illustrates the state wherein the shock absorber 2 for the road wheel 3 on one side of the vehicle body 1 is being tested by a shock absorber inspection system according to the present invention. The system generally comprises a displacement sensor 4 of the wire type serving as a means for detecting a displacement of the vehicle body 1, a load cell 6 serving as a means for detecting load imposed on the road surface by the road wheel 3, a controller 7 coupled with the displacement sensor 4 and the load cell 6. The controller 7 includes a printer as an output device. Alternatively, a display may be provided as the output device. If desired, both printer and display may be provided as the output device.

The displacement sensor 4 is securely attached to the center of a wheel or a wheel axle of the road wheel 3 by means of an apparatus generally designated at 5. The sensor 4 has a wire 4a extending in a generally vertical and upward direction. The wire 4b is connected at its free end to a bracket 4a which is detachably attached to the vehicle body at a portion adjacent to the road wheel 3 by means of a clamp or a magnet. The wire type sensor 4 generates a displacement signal indicative of the detected displacement. This signal is fed to the controller 7 via a cable.

The displacement sensor 4 is fixed to a carrier 50 of the apparatus 5. The apparatus 5 includes a rod 5a in screw engagement with the carrier 50 and two rods 5b and 5c. The rods 5b and 5c are pivoted at inner ends thereof to the carrier 50. The three rods 5a, 5b and 5c have crowns 5d, 5e, and 5f, respectively, engaging the outer periphery of the road wheel 3 at three angularly displaced positions. The rod 5a has at its outer end a handle 51. Viewing in FIG. 7, turning the handle 51 clockwise causes the rod 5a to rotate in the same direction. This rotation of the rod 5a causes the crown 5d to firmly engage the periphery of the road wheel 3, causing the carrier 50 to move in such a direction as to pull the rods 5b and 5c until the crowns 5e and 5f come into firm engagement with the periphery of the road wheel 3. The handle 51 is turned manually until all of the crowns 5d, 5e and 5f are firmly engaged with the periphery of the road wheel 5 and the displacement sensor 4 is held in appropriate relation with, i.e., as high as, the wheel axle. If it is desired to remove the displacement sensor 4, the rods 5a, 5b and 5c are easily disengaged from the road wheel 3 by turning the handle 51 in the opposite direction.

According to the apparatus 5 shown in FIG. 7, the rod 5a is screwed into the carrier 50 and the handle 51 is provided for ease of installation of the carrier 50 in appropriate relation with the wheel axle and for ease of removal.

Figure 8:
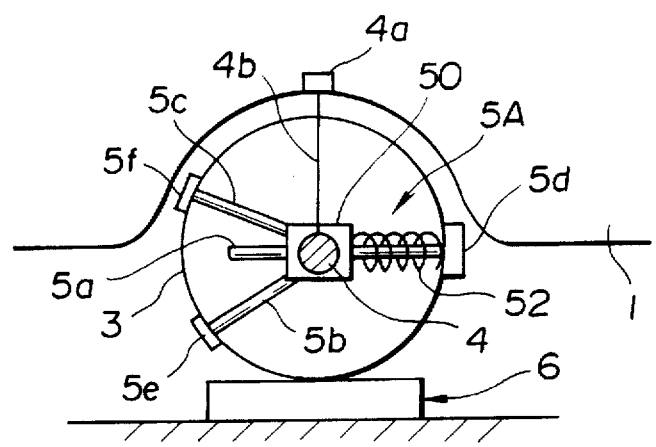
FIG. 8 is a diagram of the configuration of another form of an apparatus for securely attaching the displacement sensor to road wheel.

FIG. 8 shows a modified apparatus 5A which is substantially the same as the apparatus 5, but different from the latter in that a carrier 50 is slidably supported by a rod 5a for movement therealong and a spring 52 around the rod 5a has one end anchoring the carrier 50 and an opposite end anchoring a crown 5d fixedly attached to an outer end of the rod 5a. The spring 52 resiliently biases the carrier 50 and the crown 5d toward each other. Owing to the action of the spring 52, the crowns 5d, 5e and 5f are held in firm engagement with the periphery of the road wheel 3.

Figure 9:
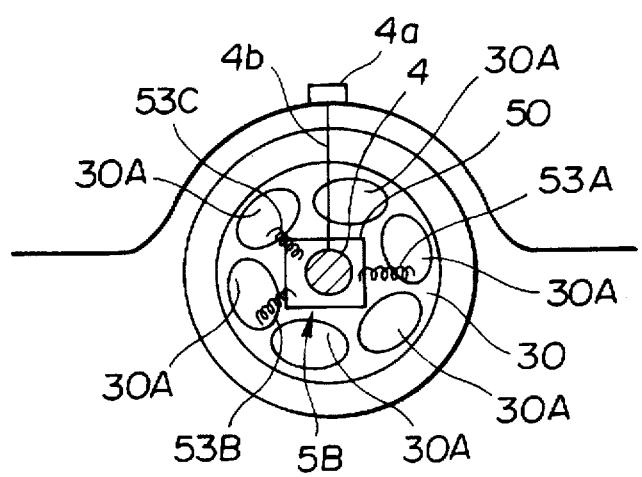
FIG. 9 is a diagram of the configuration of other form of an apparatus for securely attaching the displacement sensor to road wheel.

FIG. 9 shows other modified apparatus 5B according to which a carrier 50 is held in appropriate relation with a wheel axle of a road wheel 3 by means of three springs 53A, 53B and 53C. These springs 53A, 53B and 53C have inner ends thereof fixed to the carrier 50 and outer ends engaged in recesses or apertures 30A of a wheel cap 30. The setting of the springs 30A, 30B and 30C is such that the carrier 50 is held in appropriate relation with a wheel axle of a road wheel 3 when all of the springs 30A, 30B and 30C are brought into engagement with the corresponding apertures 30A, respectively.

Referring back to FIG. 1, the load cell 6 uses a piezoelectric gauge 6a. The load cell 6 is placed between the road surface and the road wheel 3 and generates a load signal indicative of the detected load. The load signal is fed to the controller 7 via cable.

An inspection of the shock absorber 2 is run by manually moving the vehicle body 1 in a generally vertical direction until the vehicle body 1 initiates vibration in the vertical direction, then detecting load imposed on the road surface by the road wheel at a moment when displacement of the vehicle body is zero to give the detected load as damping force at this moment and calculating a first derivative, with respect to time, of the displacement of the vehicle body 1 at the moment when displacement of the vehicle body is zero to give the result as a piston speed of the shock absorber, and then outputting the damping force with respect to the piston speed.

Figure 2:
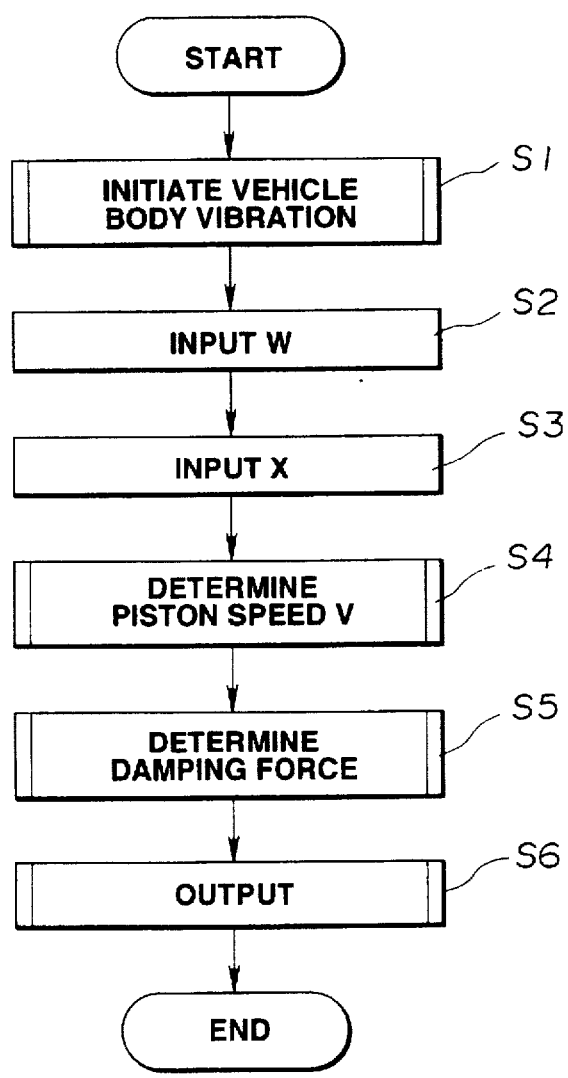
FIG. 2 is a flow diagram of routine an inspection in accordance with the system.

Routine of the inspection is illustrated by a flow chart shown in of FIG. 2.

At step S1, a bumper of the vehicle body 1 is moved up and down several times until the vehicle body 1 initiates vibration in vertical direction.

During this vibration of the vehicle body 1, the vehicle body 1 displaces relative to the road wheel 3 and load detected by the load cell 6 varies.

At step 2, the controller 7 inputs information regarding load W from the signal of the load cell 6. At step S3, the controller 7 inputs information regarding vehicle body displacement X from the signal of the displacement sensor 4. At step S4, the controller 7 calculates the first derivative, with respect to time, of the displacement X (dX/dt) at moment when the displacement X is zero to give the result as a piston speed V of the shock absorber 2 at this moment. At step S5, the controller 7 stores reading of the load W at the moment when the displacement X is zero as a damping force at this moment. At step S6, the controller 7 instructs the printer to print out the damping force (determined at step S5) with respect to the piston speed (determined at step S4).

Referring to FIGS. 3A, 3B, 3C and 3D, the manner of determining damping force at the step S5 is graphically described.

Figure 3A:
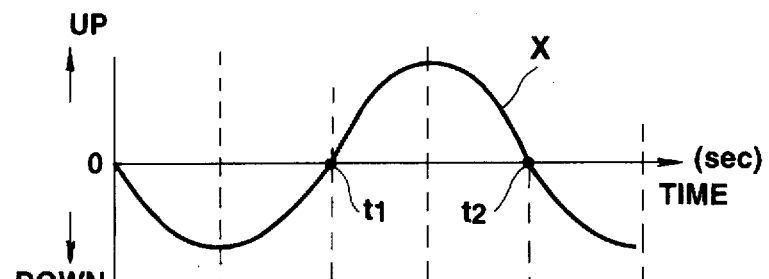
FIG. 3A is the displacement of a vehicle body with respect to time.

Displacement X, derived from the detected signal of the displacement sensor 4, varies against time as illustrated by the curve in FIG. 3A. The curve passes zero (X=0) at moment $t_1$ and another moment $t_2$. The shock absorber 2, which is subject to compression motion and expansion motion in timed relation with the vertical vibration of the vehicle body 1, becomes neutral at moments $t_1$ and $t_2$ when the displacement X is zero.

Figure 3B:
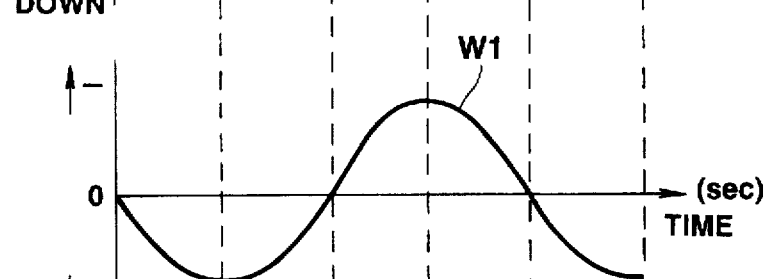
FIG. 3B is a load component owing to a suspension spring with respect to time.
Figure 3C:
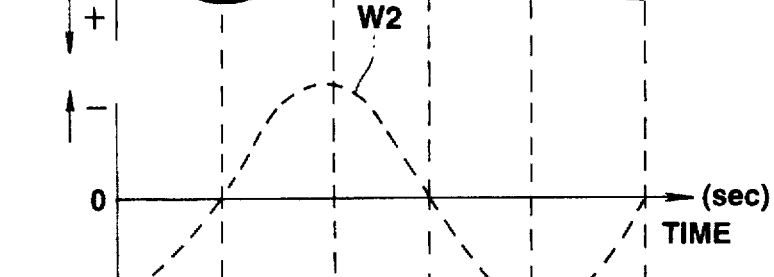
FIG. 3C is a load component owing to a shock absorber with respect to time.
Figure 3D:
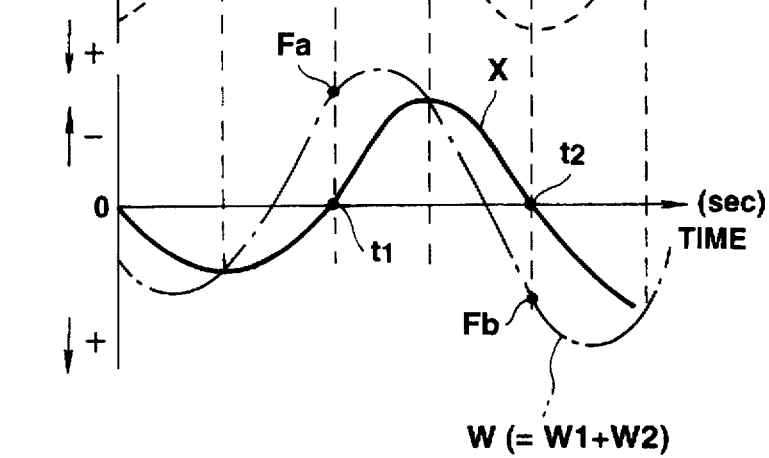
FIG. 3D is the resultant load, shown by one-dot chain line, with respect to time in comparison with the displacement of the vehicle body, shown by the fully drawn line, with respect to time.

Load W, derived from the detected signal of the load cell 6 varies with respect to time as illustrated by the one-dot chain curve in FIG. 3D. Also shown in FIG. 3D is the displacement X curve shown in FIG. 3A. It is noted that there is a phase difference between these curves. This is because load W results from superimposing a first load component W1 owing to a spring constant K of the spring associated with the shock absorber 2 and a second load component W2 owing to damping force of the shock absorber 2. FIGS. 3B and 3C show curves of the load components W1 and W2, respectively.

Load component W1 owing to the spring varies in timed relationship, i.e., without any phase difference, with the displacement X, so that the load component W1 is zero at the moments $t_1$ and $t_2$.

Thus, readings Fa and Fb (see FIG. 3D) of load W at the moments $t_1$ and $t_2$ are equal to readings of load component W2. These readings Fa and Fb may be regarded as damping force at the moment $t_1$ and damping force at the moment $t_2$. Since the vehicle body 1 moves upwardly at the moment $t_1$ and moves downwardly at the moment $t_2$, Fa indicates the magnitude of damping force during motion of the shock absorber 2 in a direction from the fully compressed state to the fully expanded state and Fb indicates the magnitude of damping force during motion of the shock absorber 2 in the opposite direction from the fully expanded state to the fully compressed state.

Figure 4:
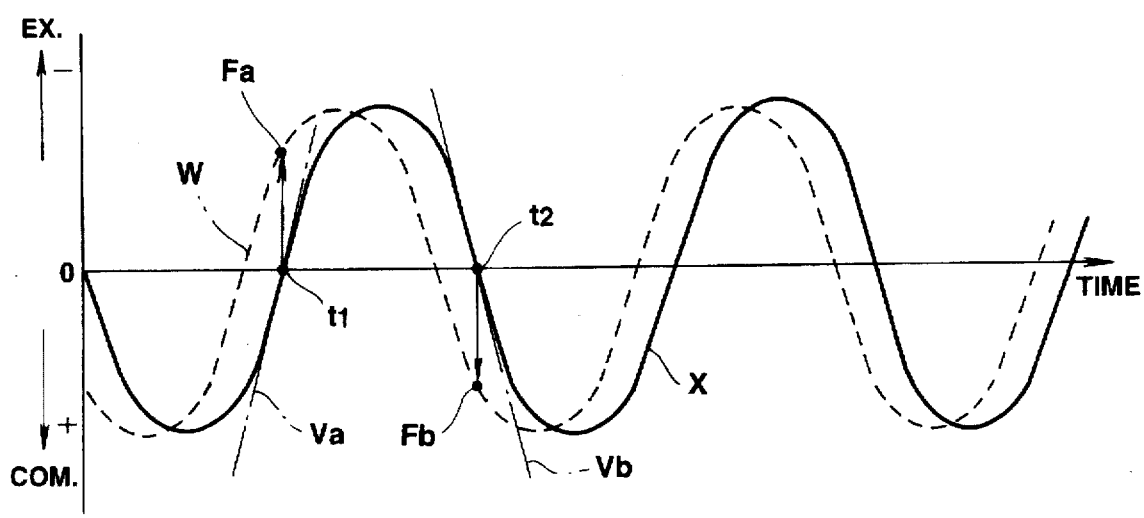
FIG. 4 is a graphical representation of damping force Fa at piston speed Va and damping force Fb at piston speed Vb wherein the displacement of the vehicle body with respect to time is shown by the fully drawn line and the load with respect to time is shown by the dotted line.

FIG. 4 graphically illustrates the manner of determining piston speed V at step S4. In FIG. 4, the vertical axis represents directions in which the shock absorber 2 moves from its neutral position and the horizontal axis represents time. The fully drawn line represents the displacement X of the vehicle body 1 with respect to time, while the dotted line represents the load W with respect to time.

In FIG. 4, the first derivative, with respect to time, of the displacement X at moment $t_1$ is illustrated as a gradient of a line segment, shown at Va, tangential to the displacement X curve at a point, shown at $t_1$, and the first derivative of the displacement X at moment $t_2$ is illustrated as a gradient of a line segment, shown at Vb, tangential to the displacement X curve at a point, shown at $t_2$. The signs, positive or negative, of these first derivatives represent directions of motion in which the shock absorber 2 is subject to. Specifically, the sign condition of the first derivative at moment $t_1$ represents that the shock absorber 2 is subject to motion in a direction from the fully compressed state to the fully expanded state, and the sign condition of the first derivative at moment $t_2$ represents that the shock absorber 2 is subject to motion in the opposite direction from the fully expanded state to the fully compressed state. In FIG. 4, a vertically and upwardly extending vector originating at the point $t_1$ and terminating at a point on the load W curve represents damping force Fa exhibited by the shock absorber 2 at the moment $t_1$, and a vertically and downwardly extending vector originating at the point $t_2$ and terminating at a point on the load W curve represents damping force Fb at the moment $t_2$.

Figure 5:
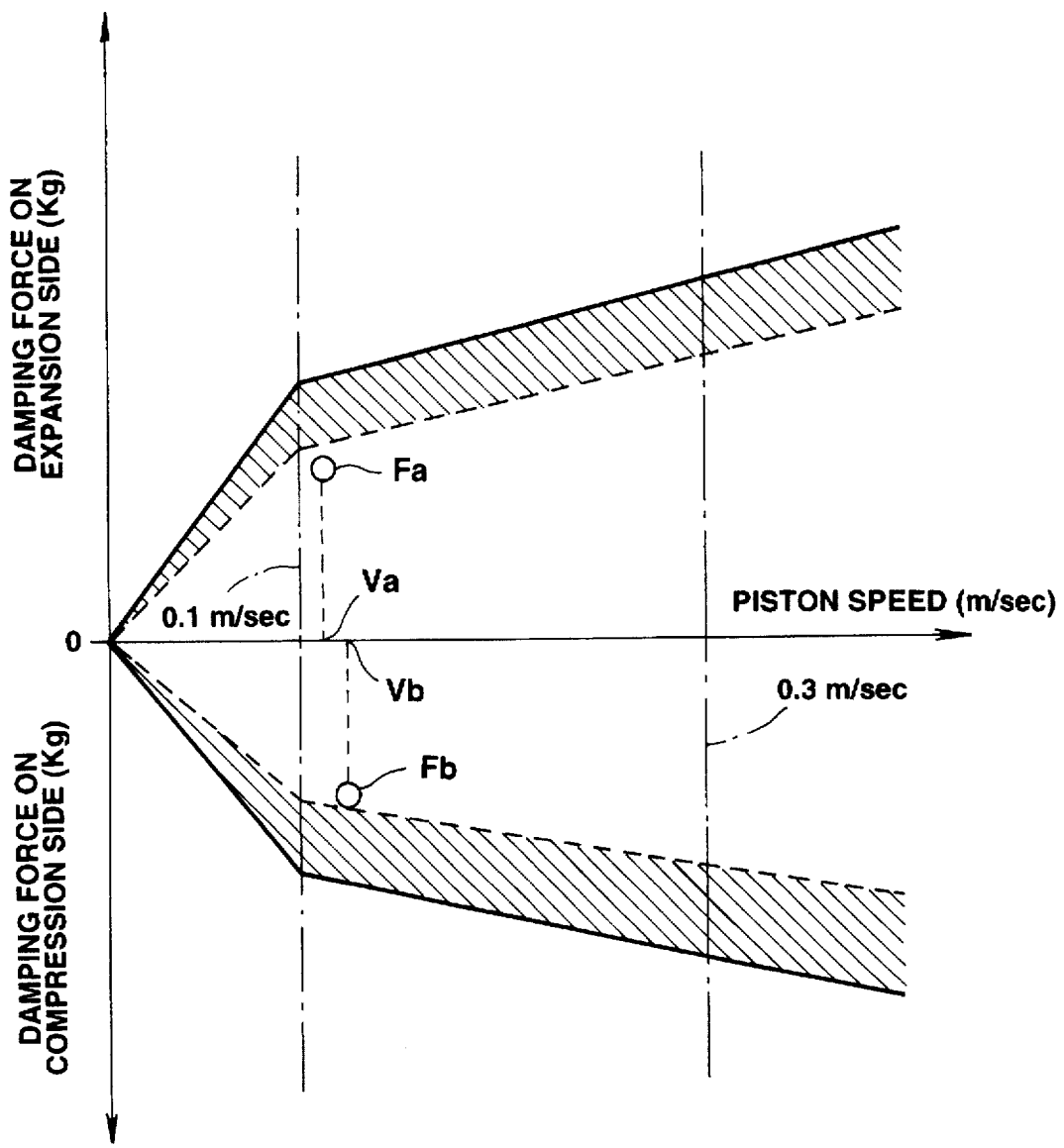
FIG. 5 is a graphical representation of predetermined windows, one for expansion motion of a shock absorber, the other for compression motion thereof.

FIG. 5 shows by the fully drawn line a damping force characteristic data of the shock absorber 2 alone when it was new. This data, hereinafter referred to as service data, may be readily available from a manufacturer thereof. In FIG. 5, an allowance in deviation from the service data is graphically represented by windows as indicated by shadowed areas. As explained before, the controller 7 outputs readings Fa and Fb of damping force coupled with readings Va and Vb of piston speed of the shock absorber 2 for ease of comparison with the service data shown in FIG. 5. The output data of the controller 7 are plotted in FIG. 5. It is noted from these plots that the degree to which the shock absorber 2 has degraded in performance can be readily recognized. If the windows indicating allowance in deviation are known, it is easy to know the current state the shock absorber 2 in terms of whether or not damping forces at various piston speeds fall in the windows and/or in terms of deviation from the service data. Specifically, the test after inspection passes if, at varying piston speeds, readings of damping force fall in the windows and the test fails if, at varying piston speeds, at least one of reading of damping force falls outside of the windows. It is now appreciated that one can easily know with good accuracy the degree to which the shock absorber has been deteriorated.

In most cases, the automobile service manuals (or new car introduction manuals) recite data at piston speed V=0.3 m/sec. as typical data of a shock absorber. However, the piston speed of the shock absorber 2 which can be induced by manual moving the vehicle body 1 for vibration thereof has an upper limit of approximately V=0.2 m/sec. Thus, for comparison with the data, it is necessary for the controller 7 to conduct interpolation based on readings of damping force obtained at piston speeds ranging from 0.1 to 0.2 m/sec to give damping force at piston speed of 0.3 m/sec. For increasing accuracy of the interpolation, the data to be used must be limited to such data which have been obtained at piston speeds above 0.1 m/sec. This is because the rate of change of damping force of the shock absorber 2 over a unit change of the piston speed changes rapidly at approximately 0.1 m/sec. (see FIG. 5).

Figure 6A:
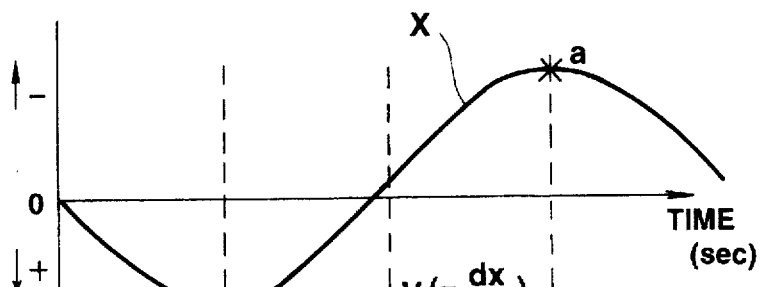
FIG. 6A is the displacement of a vehicle body with respect to time.
Figure 6B:
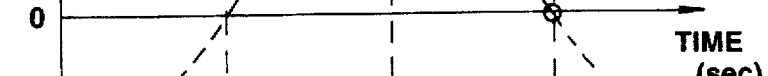
FIG. 6B is the vertical speed of the vehicle body with respect to time.
Figure 6C:
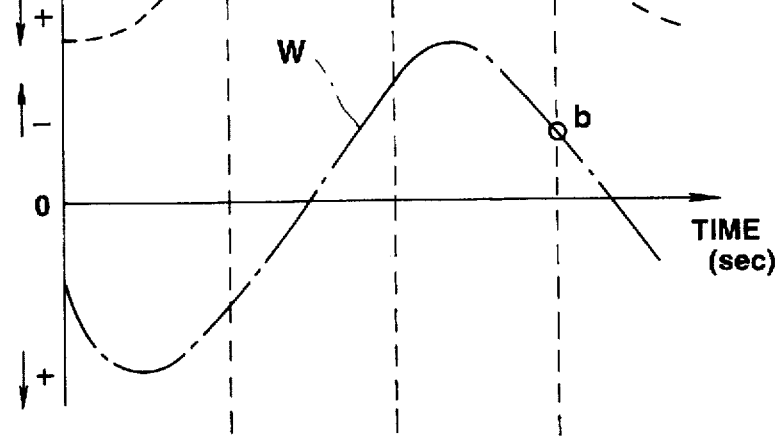
FIG. 6C is the load with respect to time.

The manner of deriving a spring constant of the spring associated with the shock absorber 2 is illustrated in FIGS. 6A, 6B, and 6C. FIG. 6A shows the displacement X curve of the vehicle body 1 with respect to time. FIG. 6B shows the piston speed V of the shock absorber 2 with respect to time. FIG. 6C is the load W curve with respect to time. Since there is no load component W2 owing to the damping force of the shock absorber 2 when the piston speed V is zero, the spring constant K is given by dividing reading b of load at V=0 by reading a of displacement X at V=0. Thus, the spring constant K can be expressed as $K=b/a$[kg/mm]

where, b is reading of load W at V=0; and a is reading of displacement X at V=0.

If desired, the spring constant K may be given as reading of displacement X when the vehicle body 1 receives at such as a bumper thereof static load.

The use of the apparatus 5 for securely attaching the displacement sensor 4 has an advantage that since the carrier 50 to which the displacement sensor 4 is fixed is held in appropriate relation to the wheel axle, the influence of elastic deformation of tire on the output data of the controller 7 is minimized.

Figure 10:
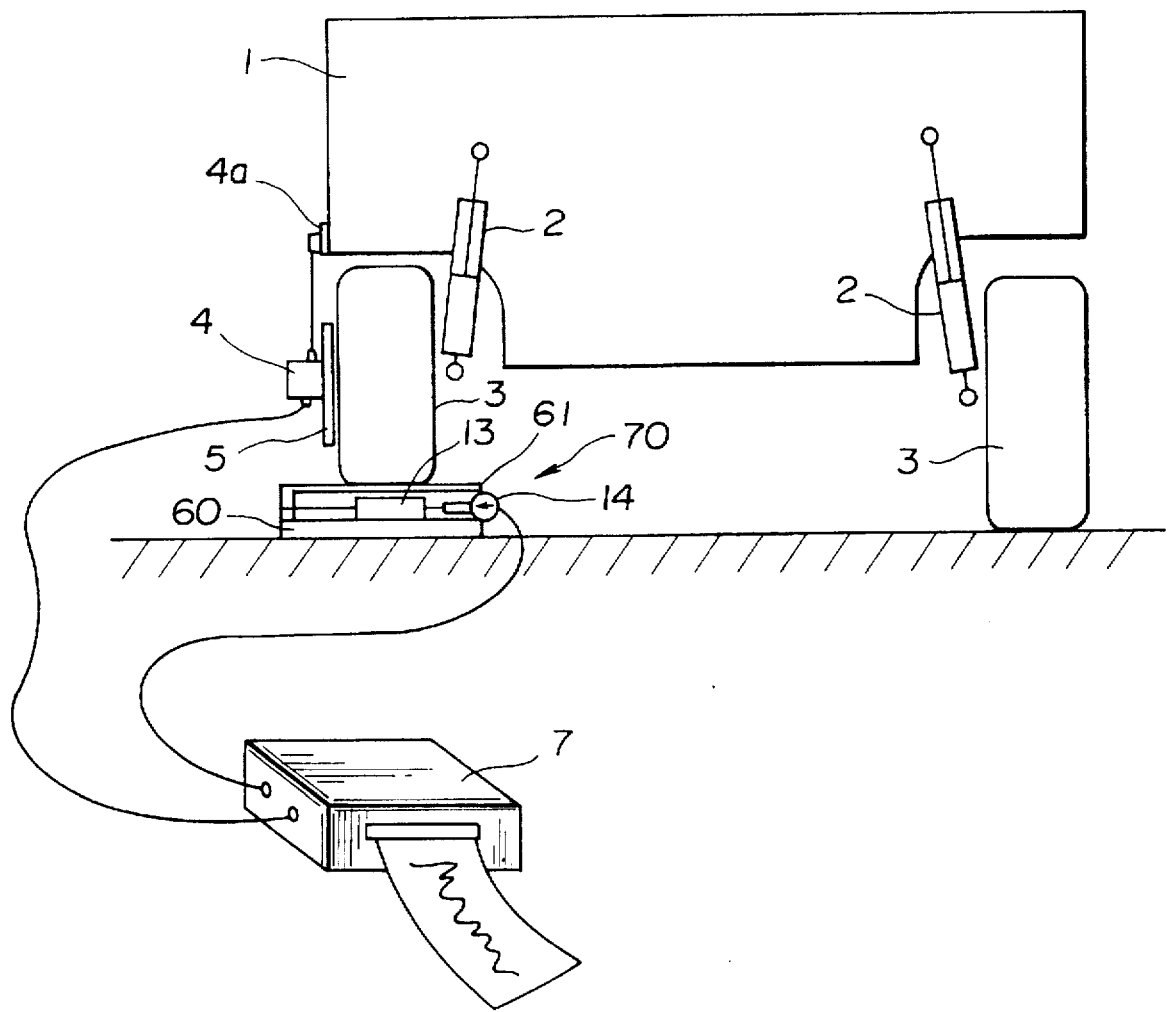
FIG. 10 illustrates a second embodiment.

FIG. 10 shows a second embodiment. This embodiment is substantially the same as the first embodiment, but different from the latter in that, instead of the load cell 6, a hydraulic load detecting means or unit 40 is used. This unit 70 has a hydraulic fluid chamber 13 defined between a base 60 and a platform 61 and a pressure sensor 14 to detect pressure within this hydraulic fluid chamber 13.

The hydraulic fluid chamber 13 is defined by a piston fixed to the platform 61 slidably disposed in a cylinder fixed to the base 60. Fluid pressure within the hydraulic fluid chamber 13 varies with load W imposed on the platform 61 by a road wheel 3. Thus, it is possible for a controller 7 to calculate the load W based on pressure within the hydraulic fluid chamber 13 and predetermined pressure acting area on the piston exposed to the hydraulic fluid chamber 13.

An advantage of the previously described embodiments resides in that a hydraulic machine to vibrate a road wheel which is used in the second one of the prior art discussed before is no longer required. Another advantage resides in light weight nature of each of components of the system.

Various modifications and variants will no doubt occur to those skilled in the art to which the invention pertains. For example, the means for detecting load may be varied from that disclosed herein or the displacement sensor may be varied from that disclosed. These and all other variations which basically rely on the teachings through which the disclosure has advanced the art are properly considered within the scope of the present invention.

What is claimed is:

1. A system for inspecting a shock absorber installed in a vehicle between a body of the vehicle and a road wheel thereof, the system comprising:

means for detecting displacement of the vehicle body and generating a displacement signal indicative of the detected displacement;

means for detecting load imposed on road surface by the road wheel and generating a load signal indicative of the detected load;

controller means coupled with said displacement measuring means and said load signal detecting means, said controller means being operative to set as a damping force the load signal upon said displacement signal being zero, said controller means being operative to calculate a first derivative, with respect to time, of the displacement signal to give the result as a piston speed of the shock absorber, said controller means being operative to compare the damping force and the piston speed with reference damping force and piston speed and determine to what degree the shock absorber has been degraded based on the result of comparison.

2. A system as recited in claim 1, wherein said displacement detecting means detects, as the displacement of the vehicle body, a relative displacement of the vehicle body to the road wheel.

3. A system as recited in claim 1, characterized in that said displacement detecting means detects, as the displacement of the vehicle body, a relative displacement of the vehicle body to the road surface.

4. A method of inspecting a shock absorber installed in a vehicle between a body of the vehicle and a road wheel thereof, the method comprising the steps of:

manually moving the vehicle body in a generally vertical direction of the vehicle until the vehicle body initiates vibration in the vertical direction;

detecting a displacement of the vehicle body in the vertical direction relative to the road wheel;

detecting load imposed on road surface by the road wheel;

giving, as a damping force, the load detected at moment when the detected displacement is zero;

calculating a first derivative, with respect to time, of the detected displacement at the moment to give the result as a piston speed of the shock absorber at the moment;

comparing the damping force against the piston speed with a predetermined damping force against the piston speed;

passing the test if, at the piston speed, the damping force falls in a predetermined window around the predetermined damping force;

failing the test if, at the piston speed, the damping force fall outside of the predetermined window.

5. A system as recited in claim 1, wherein the controller means include an output device.

6. A system as recited in claim 5, wherein the output device includes a printer.

7. A system as recited in claim 1, wherein the displacement detecting means include a displacement sensor of the wire type.

8. A system as recited in claim 7, wherein the sensor is held in appropriate relation with a wheel axle of the road wheel.

9. A system as recited in claim 8, wherein there is provided an apparatus securely attaching the sensor to the road wheel.

10. A system as recited in claim 9, wherein the apparatus includes a carrier to which the sensor is fixed.

11. A system as recited in claim 10, wherein the apparatus includes means for detachably holding the carrier in appropriate relation to the wheel axle.

12. A system as recited in claim 11, wherein the carrier holding means include a first rod in screw engagement with the carrier, and second and third rods pivoted at inner ends thereof to the carrier, the first, second and third rods having crowns, respectively, for engagement with the outer periphery of the road wheel, and wherein the first rod has at an outer end thereof a handle for manipulation of turning the first rod.

13. A system as recited in claim 11, wherein the carrier holding means include a first rod in slidable engagement with the carrier, and second and third rods pivoted at inner ends thereof to the carrier, the first, second and third rods having crowns, respectively, for engagement with the outer periphery of the road wheel, and spring means operatively connected between the carrier and the first rod.

14. A system as recited in claim 11, wherein the carrier holding means include three springs having inner ends thereof fixed to the carrier and outer ends engaged in apertures of a wheel cap of the road wheel.

15. A system as recited in claim 1, wherein the load detecting means include a load cell using a piezoelectric gauge.

16. A system for inspecting a shock absorber installed in a vehicle between a body of the vehicle and a road wheel thereof, the system comprising:

means for detecting displacement of the vehicle body and generating displacement signal indicative of the detected displacement;

means for detecting load imposed on road surface by the road wheel and generating a load signal indicative of the detected load;

controller means coupled with said displacement measuring means and said load signal detecting means, said controller means being operative to set as a damping force the load signal upon said displacement signal being zero, said controller means being operative to calculate a first derivative, with respect to time, of the displacement signal to give the result as a piston speed of the shock absorber, wherein the load detecting means include a hydraulic unit having a hydraulic fluid chamber defined between a base and a platform.

* * * * *